(12) United States Patent
Tsai et al.

(10) Patent No.: US 10,744,655 B2
(45) Date of Patent: Aug. 18, 2020

(54) PNEUMATIC CLAW-CONTROLLING APPARATUS OF A CLAW CRANE

(71) Applicant: Feiloli Electronic Co., Ltd., Hemei Town, Changhua County (TW)

(72) Inventors: Chi-Ming Tsai, Hemei Town (TW); I-Chiang Yang, Hemei Town (TW)

(73) Assignee: Feiloli Electronic Co., Ltd., Hemei Town (TW)

( * ) Notice: Subject to any disclaimer, the term of this patent is extended or adjusted under 35 U.S.C. 154(b) by 0 days.

(21) Appl. No.: 16/237,854

(22) Filed: Jan. 2, 2019

(65) Prior Publication Data

US 2020/0206957 A1 Jul. 2, 2020

(51) Int. Cl.
*B25J 15/10* (2006.01)
*B66C 3/16* (2006.01)
*B66C 3/04* (2006.01)
*F15B 11/10* (2006.01)

(52) U.S. Cl.
CPC .............. *B25J 15/103* (2013.01); *B66C 3/04* (2013.01); *B66C 3/16* (2013.01); *F15B 11/10* (2013.01); *F15B 2211/41572* (2013.01); *F15B 2211/45* (2013.01); *F15B 2211/5158* (2013.01); *F15B 2211/7052* (2013.01)

(58) Field of Classification Search
CPC .................. F15B 11/10; F15B 2211/45; F15B 2211/41572; F15B 2211/5158; F15B 2211/7052; B25J 15/103; B66C 3/16; B66C 3/04
See application file for complete search history.

(56) References Cited

U.S. PATENT DOCUMENTS

| 8,491,251 B2 * | 7/2013 | Muraoka ................. B66C 1/447 414/739 |
| 2008/0129066 A1 * | 6/2008 | Hutchinson ............. B66C 1/585 294/201 |
| 2010/0283275 A1 * | 11/2010 | Amelsfoort ............. E02F 3/246 294/106 |
| 2014/0103674 A1 * | 4/2014 | Mueller ............... B65G 11/023 294/106 |
| 2014/0132021 A1 * | 5/2014 | Claffee .................. B25J 9/0015 294/198 |

* cited by examiner

*Primary Examiner* — Stephen A Vu
(74) *Attorney, Agent, or Firm* — Alan D. Kamrath; Karin L. Williams; Mayer & Williams PC

(57) ABSTRACT

A pneumatic claw-controlling apparatus includes a claw, an air supply, a high-pressure channel, a medium-pressure channel and a low-pressure channel. The claw is normally in an opened position and movable to a closed position by working air. The air supply releases the working gas according to an air-supply signal. The high-pressure channel is operable to adjust the working gas to a high pressure and communicate the air supply with the claw according to a high-pressure signal. The medium-pressure channel is operable to adjust the working gas to a medium pressure and communicate the air supply with the claw according to a medium-pressure signal. The low-pressure channel is operable to adjust the working gas to a low pressure and communicate the air supply with the claw according to a low-pressure signal. The releasing channel is operable to block the claw from the atmosphere according to a vent-stopping signal.

9 Claims, 5 Drawing Sheets

PNEUMATIC CLAW-CONTROLLING APPARATUS OF A CLAW CRANE

BACKGROUND OF INVENTION

1. Field of Invention

The present invention relates to a claw crane and, more particularly, to a pneumatic claw-controlling apparatus of a claw crane.

2. Related Prior Art

A claw crane includes a box, a crane inserted in the box, and a claw connected to the crane. The crane lifts the claw and moves the claw to a location above a targeted prize such as a doll and a 3C product. Then, the crane lowers the claw. Then, the claw is moved from an opened position to a closed position to fetch the targeted prize. Then, the crane lifts the claw and moves the claw to a location above a chute. Then, the claw is moved from the closed position to the opened position to drop the targeted prize onto the chute through which the targeted prize slips out of the box.

Conventionally, a solenoid is used to open and close the claw. However, a small solenoid fails to provide the claw with an adequate force to fetch a prize, a heavy prize in particular. Therefore, a chance of success in fetching a prize is low, and this turns potential customers away.

A large solenoid provides the claw with an adequate force to fetch a heavy prize. However, a large solenoid is heavy and inevitably consumes a lot of electricity and generates a lot of undesirable heat that could damage a circuit board.

Working gas or air can be used to open and close the claw. The working gas or air provides the claw with an adequate force to fetch a prize, even a heavy prize. The chance of success in fetching a prize is high. However, this means an undesirable loss of money for an owner of a claw crane. Hence, working gas or air is not desired for claw cranes.

The present invention is therefore intended to obviate or at least alleviate the problems encountered in prior art.

SUMMARY OF INVENTION

It is the primary objective of the present invention to provide a claw crane with a balanced pneumatic claw-controlling apparatus.

To achieve the foregoing objective, the pneumatic claw-controlling apparatus includes a pneumatic claw, an air supply, a high-pressure channel, a medium-pressure channel, a low-pressure channel and a controller. The pneumatic claw is normally in an opened position and movable to a closed position by working air. The air supply releases the working gas or air according to an air-supply signal. The high-pressure channel is connected to the pneumatic claw and the air supply, and operable to adjust the working gas to a high pressure and communicate the air supply with the pneumatic claw according to a high-pressure signal. The medium-pressure channel is connected to the high-pressure channel in parallel, and operable to adjust the working gas to a medium pressure and communicate the air supply with the pneumatic claw according to a medium-pressure signal. The low-pressure channel is connected to the medium-pressure channel in parallel, and operable to adjust the working gas to a low pressure and communicate the air supply with the pneumatic claw according to a low-pressure signal. The releasing channel is connected to the low-pressure channel, and operable to block the pneumatic claw from the atmosphere according to a vent-stopping signal. The controller is electrically connected to the air supply, the high-pressure channel, the medium-pressure channel, the low-pressure channel and the releasing channel, and operable to selectively transmit the air-supply signal, the high-pressure, medium-pressure or low-pressure signal and the vent-stopping signal.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
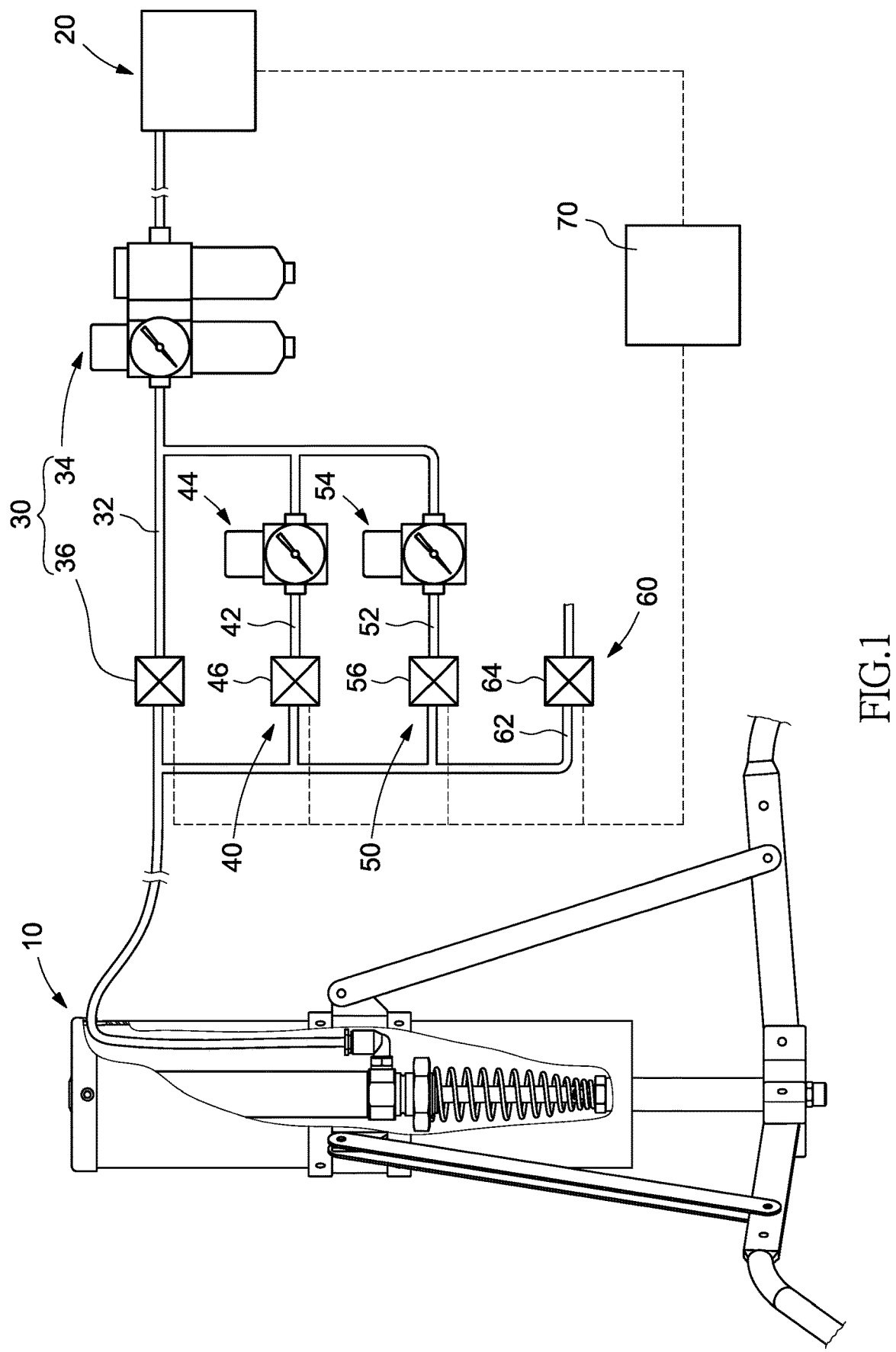
FIG. 1 is a block diagram of a pneumatic claw-controlling apparatus according to the preferred embodiment of the present invention.

Referring to FIG. 1, a claw crane includes a pneumatic claw 10 and a pneumatic claw-controlling apparatus according to the preferred embodiment of the present invention. The pneumatic claw-controlling apparatus includes a pneumatic claw 10, an air supply 20, a high-pressure channel 30, a medium-pressure channel 40, a low-pressure channel 50, a releasing channel 60 and a controller 70.

The pneumatic claw 10 is normally opened. The pneumatic claw 10 is closed when it receives working gas or air. The pneumatic claw 10 will not be described in detail for being conventional.

The air supply 20 provides working gas or air or stops providing the working gas or air under control of the controller 70. The air supply 20 includes a tank and/or a compressor. The air supply 20 will not be described in detail for being conventional.

The high-pressure channel 30 is located between the pneumatic claw 10 and the air supply 20. The medium-pressure channel 40 is located between the pneumatic claw 10 and the air supply 20. The low-pressure channel 50 is located between the pneumatic claw 10 and the air supply 20. The high-pressure channel 30, the medium-pressure channel 40 and the low-pressure channel 50 are connected to one another in parallel.

The high-pressure channel 30 receives the pressured air from the air supply 20 and adjusts the pressure of the pressured air to a high pressure. The high-pressure channel 30 selectively transfers the working gas or air to the pneumatic claw 10. The high-pressure channel 30 includes a high-pressure pipe 32, a high-pressure adjuster 34 and a high-pressure valve 36.

The high-pressure pipe 32 is connected to the pneumatic claw 10 at an end and connected to the air supply 20 at another end.

The high-pressure adjuster 34 is located in a section of the high-pressure pipe 32, between the pneumatic claw 10 and the air supply 20. The high-pressure adjuster 34 adjusts the pressure of the pressurized to the high pressure for a high-pressure operation. The high pressure is in a range of 3.5 to 4.5 bars for example.

The high-pressure valve 36 is located in another section of the high-pressure pipe 32, between the pneumatic claw 10 and the high-pressure adjuster 34. In compliance with a high-pressure signal, the high-pressure valve 36 transfers the working gas or air to the pneumatic claw 10 from the high-pressure adjuster 34 (the air supply 20). Preferably, the high-pressure valve 36 is normally closed so that the working gas or air cannot go to the pneumatic claw 10 from the high-pressure adjuster 34 (the air supply 20).

The medium-pressure channel 40 receives the working gas or air from the air supply 20 through the high-pressure adjuster 34 and adjusts the pressure of the working gas or air to a medium pressure. The medium-pressure channel 40 selectively transfers the working gas or air to the pneumatic claw 10. The medium-pressure channel 40 includes a medium-pressure pipe 42, a medium-pressure adjuster 44 and a medium-pressure valve 46.

The medium-pressure pipe 42 is connected to the pneumatic claw 10 at a first end and connected to the high-pressure valve 36 at a second end. The first end of the medium-pressure pipe 42 is located between the high-pressure valve 36 and the pneumatic claw 10. The second end of the medium-pressure pipe 42 is located between the high-pressure valve 36 and high-pressure adjuster 34.

The medium-pressure adjuster 44 is located in a section of the medium-pressure pipe 42, between the pneumatic claw 10 and the high-pressure adjuster 34. The medium-pressure adjuster 44 adjusts the pressure of the working gas or air to a medium pressure. Preferably, the medium pressure is in a range of 1.5 to 2.5 bars for example.

The medium-pressure valve 46 is located in a section of the medium-pressure pipe 42, between the pneumatic claw 10 and the medium-pressure adjuster 44. In compliance with a medium-pressure signal, the medium-pressure valve 46 selectively transfers the working gas or air into the pneumatic claw 10 from the medium-pressure adjuster 44 (air supply 20). Preferably, the medium-pressure valve 46 is normally closed so that the working gas or air cannot go into the pneumatic claw 10 from the medium-pressure adjuster 44 (air supply 20).

The low-pressure channel 50 receives the working gas or air from the air supply 20 through the high-pressure adjuster 34 and adjusts the pressure of the working gas or air to a medium pressure. The low-pressure channel 50 selectively transfers the working gas or air to the pneumatic claw 10. The low-pressure channel 50 includes a low-pressure pipe 52, a low-pressure adjuster 54 and a low-pressure valve 56.

The low-pressure pipe 52 is connected to the pneumatic claw 10 at a first end and connected to the high-pressure valve 36 at a second end. The first end of the low-pressure pipe 52 is located between the high-pressure valve 36 and the pneumatic claw 10. The second end of the low-pressure pipe 52 is located between the high-pressure valve 36 and high-pressure adjuster 34.

The low-pressure adjuster 54 is located in a section of the low-pressure pipe 52, between the pneumatic claw 10 and the high-pressure adjuster 34. The low-pressure adjuster 54 adjusts the pressure of the working gas or air to a low pressure. Preferably, the low pressure is in a range of 0.5 to 1.5 bars for example.

The low-pressure valve 56 is located in a section of the low-pressure pipe 52, between the pneumatic claw 10 and the low-pressure adjuster 54. In compliance with a low-pressure signal, the low-pressure valve 56 selectively transfers the working gas or air into the pneumatic claw 10 from the low-pressure adjuster 54 (air supply 20). Preferably, the low-pressure valve 56 is normally closed so that the working gas or air cannot go into the pneumatic claw 10 from the low-pressure adjuster 54 (air supply 20).

The releasing channel 60 is connected to the low-pressure pipe 52, and selectively transfers the working gas or air into the atmosphere. The releasing channel 60 includes a pressure-releasing pipe 62 and a stopper valve 64.

An end of the pressure-releasing pipe 62 is connected to a section of the low-pressure pipe 52 between the low-pressure valve 56 and the pneumatic claw 10. Another end of the pressure-releasing pipe 62 is in communication with the atmosphere.

The stopper valve 64 is connected to the pressure-releasing pipe 62 in serial. According to a vent-stopping signal, the stopper valve 64 is closed so that the working gas or air cannot go into the atmosphere from the pneumatic claw 10. Preferably, the stopper valve 64 is normally opened so that the pneumatic claw 10 is in communication of air with the atmosphere.

The controller 70 is electrically connected to the air supply 20, the high-pressure valve 36, the medium-pressure valve 46, the low-pressure valve 56 and the stopper valve 64. The controller 70 selectively transmits an air-supply signal, a high-pressure signal, a medium-pressure signal, a low-pressure signal and/or a vent-stopping signal.

The operation of the pneumatic claw-controlling apparatus will be described. In an idle (or "stand-by") state, the high-pressure valve 36, the medium-pressure valve 46 and the low-pressure valve 56 are normally closed, and the stopper valve 64 is normally opened. According to a predetermined process that might be embodied in a software program, the controller 70 selectively transmits an air-supply signal, a high-pressure signal, a medium-pressure signal, a low-pressure signal and/or a vent-stopping signal.

Figure 2:
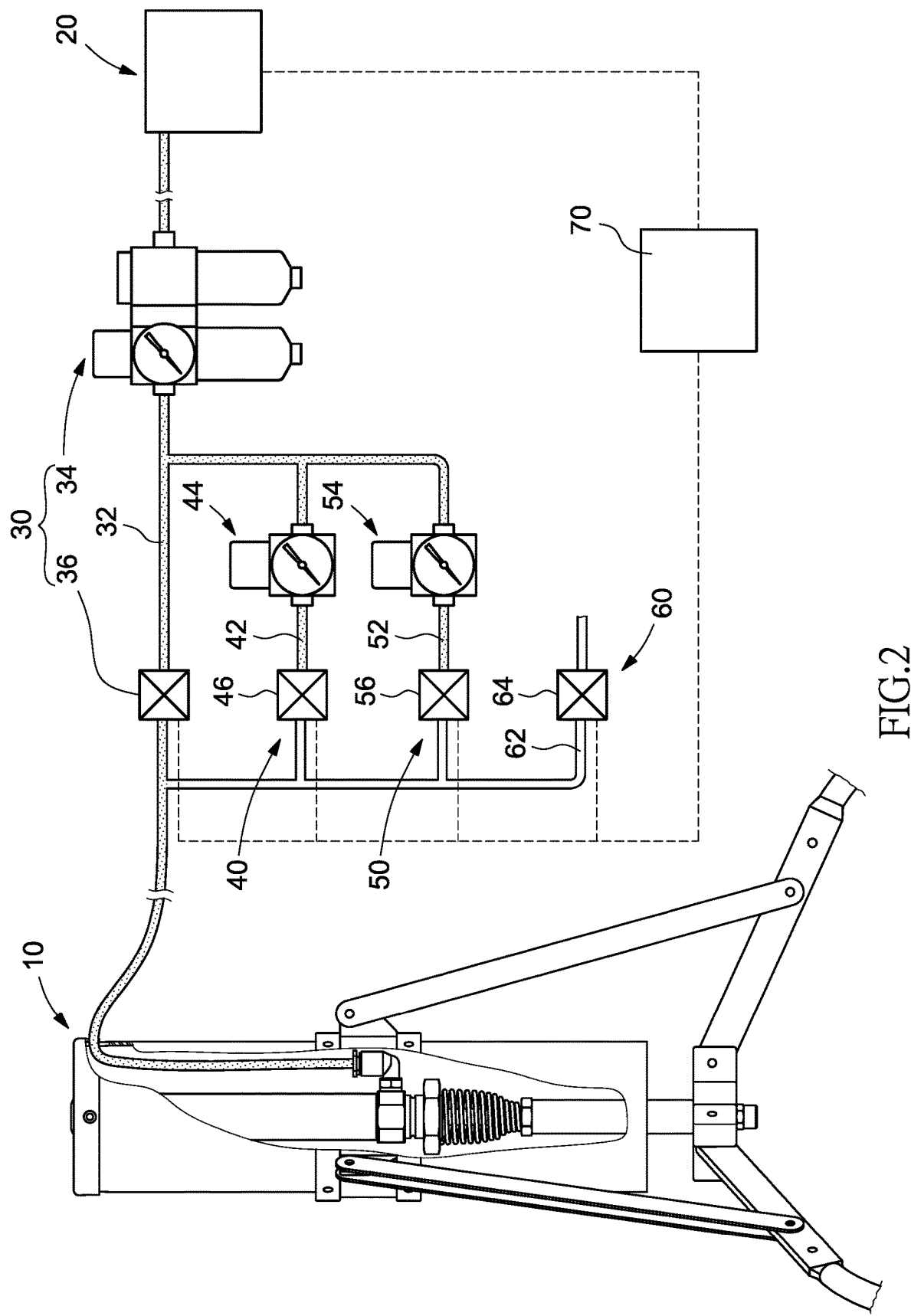
FIG. 2 is a block diagram of the pneumatic claw-controlling apparatus in another position than shown in FIG. 1.

Referring to FIG. 2, for example, the controller 70 transmits signals to close the pneumatic claw 10 in a high-pressure mode. In detail, the controller 70 transmits an air-supply signal to the air supply 20, a high-pressure signal to the high-pressure valve 36, and a vent-stopping signal to the stopper valve 64. Thus, the air supply 20 releases the working gas or air into the high-pressure adjuster 34 via the high-pressure pipe 32. The high-pressure adjuster 34 adjusts the pressure of the working gas or air to a high pressure. The working gas or air advances to high-pressure valve 36 via the high-pressure pipe 32. Now, the high-pressure valve 36 is opened according to high-pressure signal and the stopper valve 64 is closed according to the vent-stopping signal. Thus, the working gas or air advances into the pneumatic claw 10 via the high-pressure pipe 32, and moves the pneumatic claw 10 to a closed position from an opened position.

Figure 3:
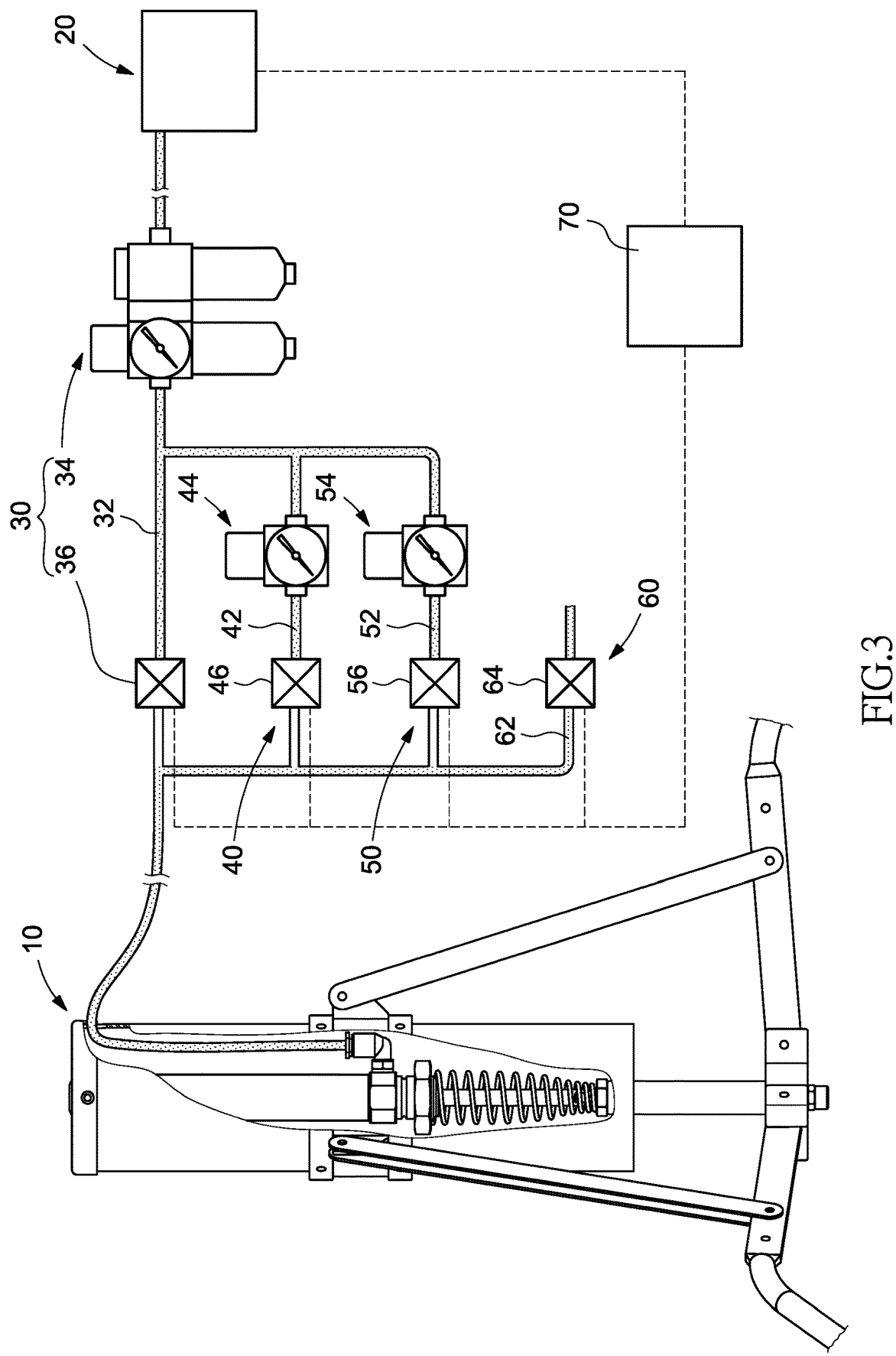
FIG. 3 is a block diagram of the pneumatic claw-controlling apparatus in another position than shown in FIG. 2.

Referring to FIG. 3, the controller 70 opens the pneumatic claw 10. In detail, the controller 70 stops transmitting the air-supply signal, the high-pressure signal and the vent-stopping signal. The air supply 20 stops the provision of the working gas or air without the air-supply signal. The high-pressure valve 36 is moved to the closed position without the high-pressure signal. The stopper valve 64 is returned to the opened position without the vent-stopping signal. Thus, the pneumatic claw 10 releases the working gas or air to the atmosphere, thereby allowing the pneumatic claw 10 to return to the opened position.

Figure 4:
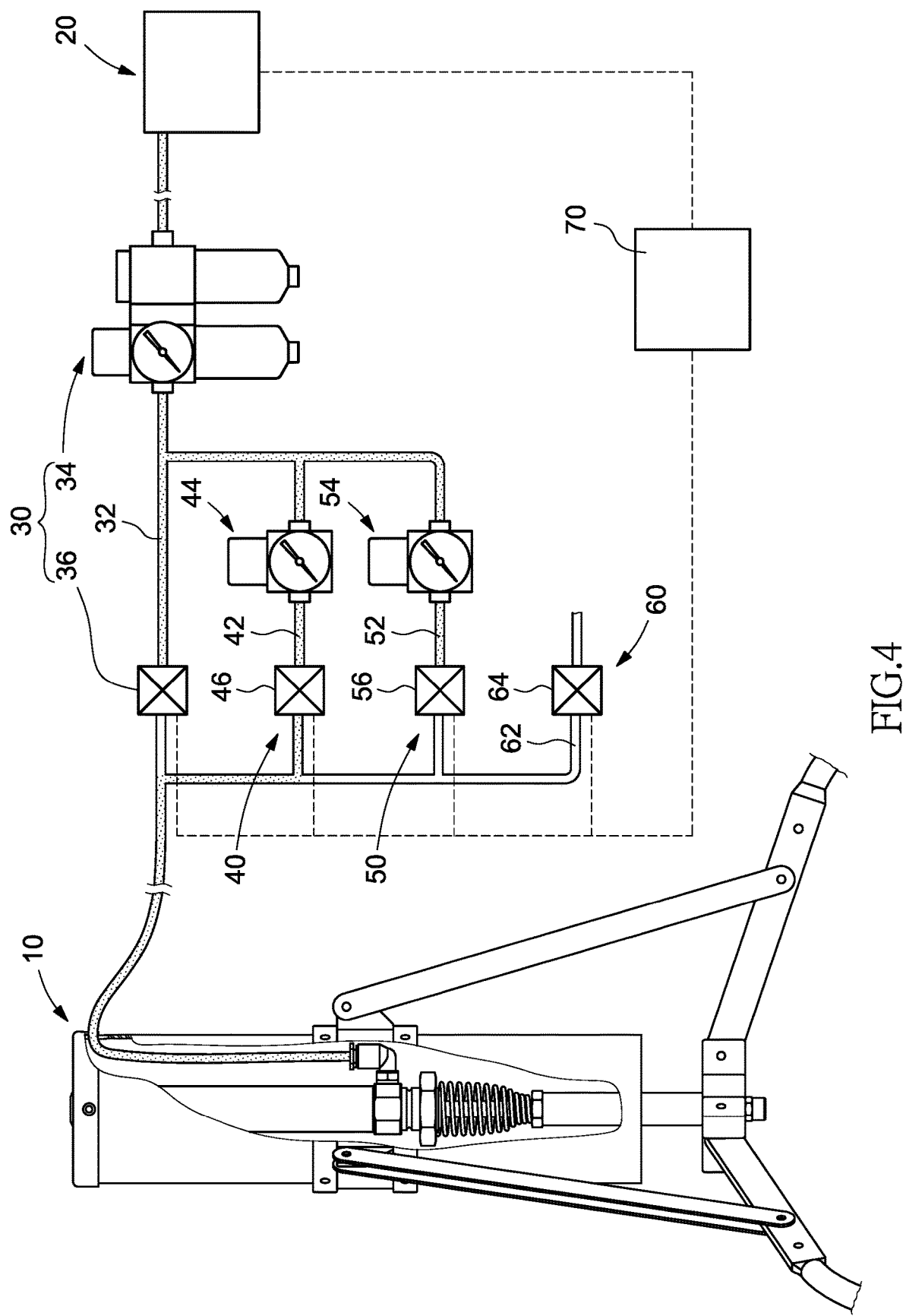
FIG. 4 is a block diagram of the pneumatic claw-controlling apparatus in another position than shown in FIGS. 3.

Referring to FIG. 4, for example, the controller 70 transmits signals to close the pneumatic claw in a medium-pressure mode. In detail, the controller 70 transmits the air-supply signal to the air supply 20, the medium-pressure signal to the medium-pressure valve 46 and the vent-stopping signal to the stopper valve 64. Thus, the air supply 20 releases the working gas or air into the medium-pressure pipe 42 via the high-pressure pipe 32. The working gas or air advances into the medium-pressure adjuster 44. The medium-pressure adjuster 44 adjusts the pressure of the pressurized to the medium pressure. The working gas or air advances into the medium-pressure valve 46 via the medium-pressure pipe 42. Now, the medium-pressure valve 46 is opened according to the medium-pressure signal, and the stopper valve 64 is closed according to the leak-stopping signal. Thus, the working gas or air advances into the pneumatic claw 10 via the medium-pressure pipe 42, and moves the pneumatic claw 10 to the closed position from the opened position.

Referring to FIG. 3, the controller 70 opens the pneumatic claw 10. In detail, the controller 70 stops transmitting the air-supply signal, the medium-pressure signal and the vent-stopping signal. The air supply 20 stops the provision of the working gas or air without the air-supply signal. The medium-pressure valve 46 is returned to the closed position without the medium-pressure signal. The stopper valve 64 is returned to the opened position without the vent-stopping signal. Thus, the pneumatic claw 10 releases the working gas or air to the atmosphere, thereby allowing the pneumatic claw 10 to return to the opened position.

Figure 5:
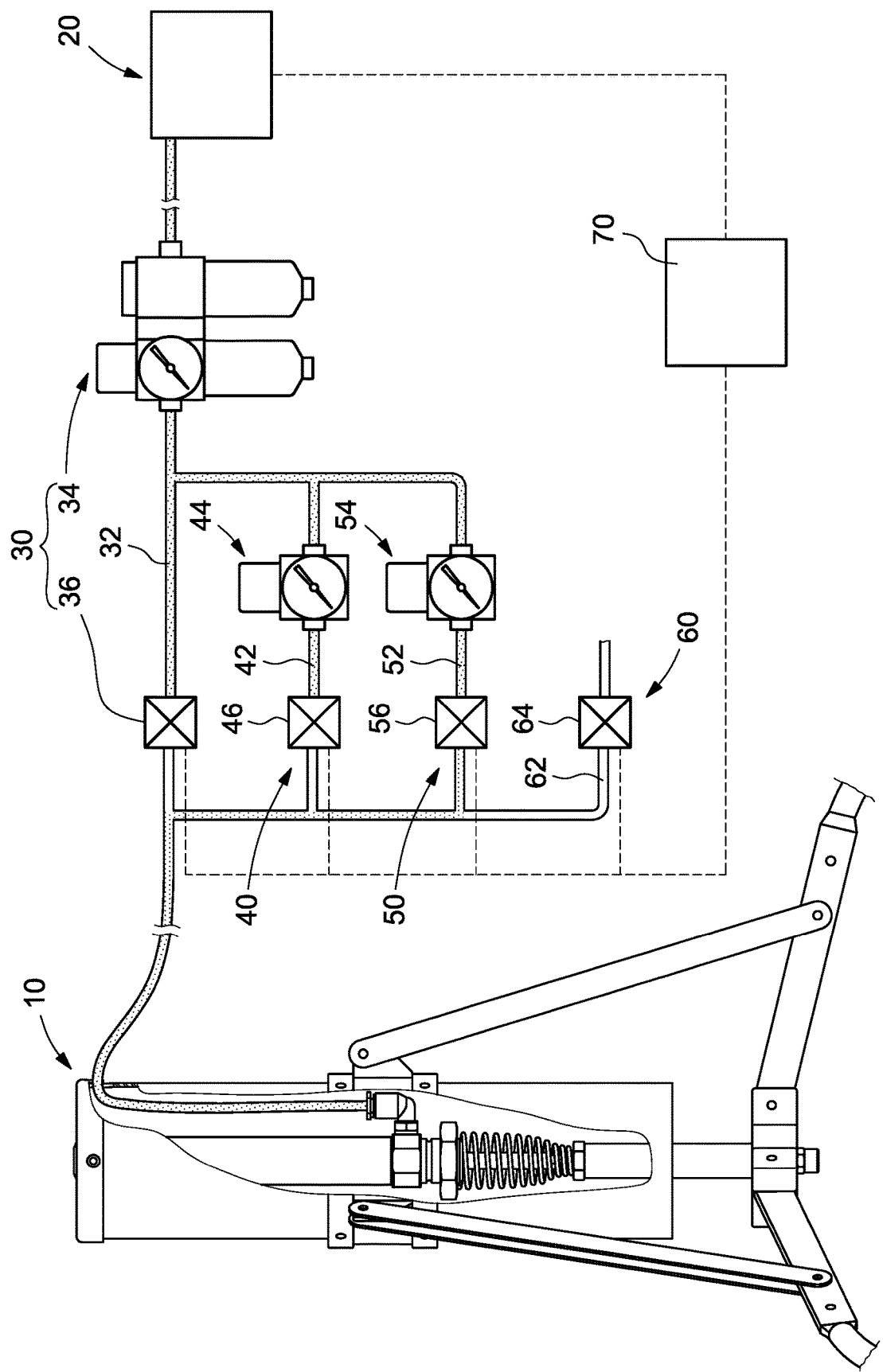
FIG. 5 is a block diagram of the pneumatic claw-controlling apparatus in another position than shown in FIG. 4.

Referring to FIG. 5, for example, the controller 70 transmits signals to close the pneumatic claw 10 in a low-pressure mode. In detail, the controller 70 transmits the air-supply signal to the air supply 20, the low-pressure signal to the low-pressure valve 56, and the vent-stopping signal to the stopper valve 64. Thus, the air supply 20 releases the working gas or air into the low-pressure pipe 52 via the high-pressure pipe 32. The working gas or air advances into the low-pressure adjuster 54 that adjusts the pressure of the working gas or air to the low pressure. The working gas or air advances into the low-pressure valve 56 via the low-pressure pipe 52. Now, the low-pressure valve 56 is opened according to the medium-pressure signal, and the stopper valve 64 is closed according to the vent-stopping signal. Thus, the working gas or air advances into the pneumatic claw 10 via the low-pressure pipe 52, and moves the pneumatic claw 10 to the closed position from the opened position.

Referring to FIG. 3, the controller 70 opens the pneumatic claw 10. In detail, the controller 70 stops transmitting the air-supply signal, the low-pressure signal and the vent-stopping signal. The air supply 20 stops the provision of the working gas or air without the air-supply signal. The medium-pressure valve 46 is returned to the closed position without the low-pressure signal. The stopper valve 64 is returned to the opened position without the vent-stopping signal. Thus, the pneumatic claw 10 releases the working gas or air to the atmosphere, thereby allowing the pneumatic claw 10 to return to the opened position.

Advantageously, an owner of the claw crane can selectively use the high-pressure channel 30, the medium-pressure channel 40 or the low-pressure channel 50 to provide a large, medium or small force to close the claw 10 according to what prizes he or she offers. This fulfills the owner's need.

In the preferred embodiment, the medium-pressure adjuster 44 is connected to the air supply 20 through the high-pressure adjuster 34 so that the working gas or air goes into the medium-pressure adjuster 44 from the air supply 20 through the high-pressure adjuster 34, and so is the low-pressure adjuster 54. Thus, if needed, only one compressor is included in the high-pressure adjuster 34 to adjust the pressure of the working gas or air to the high pressure, and the medium-pressure adjuster 44 and the low-pressure adjuster 54 can adjust the pressure of the working gas or air without having to include another compressor. This is inexpensive. However, in another embodiment, the medium-pressure adjuster 44 can be directly connected to the air supply 20, not through the high-pressure adjuster 34, so that the working gas or air goes into the medium-pressure adjuster 44 without going through the high-pressure adjuster 34, and so is the low-pressure adjuster 54.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A pneumatic claw-controlling apparatus comprising:
   a pneumatic claw normally in an opened position and movable to a closed position by working air;
   an air supply for releasing a working gas according to an air-supply signal;
   a high-pressure channel connected to the pneumatic claw and the air supply, and operable to adjust the working gas to a high pressure and communicate the air supply with the pneumatic claw according to a high-pressure signal;
   a medium-pressure channel connected to the high-pressure channel in parallel, and operable to adjust the working gas to a medium pressure and communicate the air supply with the pneumatic claw according to a medium-pressure signal;
   a low-pressure channel connected to the medium-pressure channel in parallel, and operable to adjust the working gas to a low pressure and communicate the air supply with the pneumatic claw according to a low-pressure signal;
   a releasing channel connected to the low-pressure channel, and operable to block the pneumatic claw from the atmosphere according to a vent-stopping signal; and
   a controller electrically connected to the air supply, the high-pressure channel, the medium-pressure channel, the low-pressure channel and the releasing channel, and operable to selectively transmit the air-supply signal, one of the high-pressure, medium-pressure and low-pressure signals and the vent-stopping signal.

2. The pneumatic claw-controlling apparatus according to claim 1, wherein the air supply is selected from the group consisting of a tank and a compressor.

3. The pneumatic claw-controlling apparatus according to claim 1, wherein the high-pressure channel comprises:
   a high-pressure pipe comprising two ends respectively connected to the pneumatic claw and the air supply;
   a high-pressure adjuster located in a section of the high-pressure pipe between the pneumatic claw and the air supply, and operable to adjust the working gas to the high pressure; and
   a high-pressure valve located in a section of the high-pressure pipe between the pneumatic claw and the high-pressure adjuster, and operable to communicate the pneumatic claw with the high-pressure adjuster according to the high-pressure signal.

4. The pneumatic claw-controlling apparatus according to claim 3, wherein the high pressure is in a range of 3.5 to 4.5 bars.

5. The pneumatic claw-controlling apparatus according to claim 3, wherein the medium-pressure channel comprises:
a medium-pressure pipe comprising an end connected to a section of the high-pressure pipe between the high-pressure valve and the pneumatic claw and another end connected to another section of the high-pressure pipe between the high-pressure valve and the high-pressure adjuster;
a medium-pressure adjuster located in a section of the medium-pressure pipe between the pneumatic claw and the high-pressure adjuster, and operable to adjust the working gas to the medium pressure; and
a medium-pressure valve located in a section of the medium-pressure pipe between the pneumatic claw and the medium-pressure adjuster, and operable to communicate the pneumatic claw with the medium-pressure adjuster according to the medium-pressure signal.

6. The pneumatic claw-controlling apparatus according to claim 5, wherein the medium pressure is in a range of 1.5 to 2.5 bars.

7. The pneumatic claw-controlling apparatus according to claim 5, wherein the low-pressure channel comprises:
a low-pressure pipe comprising an end connected to a section of the medium-pressure pipe between the medium-pressure valve and the pneumatic claw and another end connected to another section of the medium-pressure pipe between the medium-pressure adjuster and the high-pressure adjuster;
a low-pressure adjuster located in a section of the low-pressure pipe between the pneumatic claw and the high-pressure adjuster, and operable to adjust the working gas to the low pressure; and
a low-pressure valve located in a section of the low-pressure pipe between the pneumatic claw and the low-pressure adjuster, and operable to communicate the pneumatic claw with the low-pressure adjuster according to the low-pressure signal.

8. The pneumatic claw-controlling apparatus according to claim 7, wherein the low pressure is in a range of 0.5 to 1.5 bars.

9. The pneumatic claw-controlling apparatus according to claim 7, wherein the releasing channel comprises:
a pressure-releasing pipe comprising an end connected to a section of the low-pressure pipe between the low-pressure valve and the pneumatic claw and another end in communication of air with the atmosphere; and
a stopper valve located in a section of the pressure-releasing pipe, and operable to block the pneumatic claw from the atmosphere according to a vent-stopping signal.

* * * * *